United States Patent
Liu et al.

(10) Patent No.: US 9,558,049 B1
(45) Date of Patent: Jan. 31, 2017

(54) SHUFFLE OPTIMIZATION IN MAP-REDUCE PROCESSING

(71) Applicant: International Business Machines Corporation, Armonk, NY (US)

(72) Inventors: Liang Liu, Beijing (CN); Junmei Qu, Beijing (CN); Chao Qiang Zhu, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/880,396

(22) Filed: Oct. 12, 2015

(51) Int. Cl.
*G06F 9/54* (2006.01)

(52) U.S. Cl.
CPC ............. *G06F 9/544* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 7,650,331 | B1* | 1/2010 | Dean | G06F 9/5066 712/203 |
| 2012/0311581 | A1* | 12/2012 | Balmin | G06F 9/5066 718/100 |
| 2013/0332931 | A1* | 12/2013 | Malewicz | G06F 7/38 718/102 |
| 2014/0059552 | A1 | 2/2014 | Cunningham et al. | |
| 2014/0358977 | A1 | 12/2014 | Cramer et al. | |
| 2015/0100592 | A1 | 4/2015 | Balikov et al. | |
| 2015/0150018 | A1 | 5/2015 | Hu et al. | |

FOREIGN PATENT DOCUMENTS

CN    103605576    2/2014

OTHER PUBLICATIONS

Li et al, Improving the Shuffle of Hadoop MapReduce, 2013 IEEE International Conference on Cloud Computing Technology and Science.

* cited by examiner

*Primary Examiner* — Shih-Wei Kraft
(74) *Attorney, Agent, or Firm* — Alexa Ashworth

(57) ABSTRACT

Shuffle optimization in map-reduce processing. The method includes: obtaining intermediate results from a plurality of mappers for an application on a computing device; combining the intermediate results from the plurality of mappers; and partitioning the combined intermediate results into intermediate results for respective reducers for the application based on respective keys of the combined intermediate results.

8 Claims, 5 Drawing Sheets

SHUFFLE OPTIMIZATION IN MAP-REDUCE PROCESSING

BACKGROUND

Map-Reduce is a framework for processing parallelizable problems across huge datasets using a large number of computing nodes, collectively referred to as a cluster or a grid. The processing can be performed on data stored either in a filesystem (unstructured) or in a database (structured). The processing usually comprises a "map" processing, a "shuffle" processing and a "reduce" processing. In the "map" processing, each of mappers processes input data and writes output data to a temporary storage on a disk. In the "shuffle" processing, output data from the mappers will be redistributed based on output keys produced by the mappers, such that all data belonging to one key are located on the same node. In the "reduce" processing, respective reducers process each group of output data, per key, in parallel.

Particularly, in the Map-Reduce frame, for each mapper, intermediate results will be stored in memory after its generation, stored into a local disk after computation and then be copied into memory for network transmission, which means many processes. Besides, it might also result in a huge amount of files. For example, if there are M mappers and R reducers, there will be M*R intermediate files stored in the local disk. Usually, each of M and R is a large number, for example 1000, which might result in one million files for a file system such as Hadoop or Yarn system. Furthermore, such a huge number of files might in turn induce issues such as huge Input/Output (I/O), and etc.

SUMMARY

According to one aspect of the present invention, there is provided a computer implemented method. The method includes obtaining intermediate results from a plurality of mappers for an application on a computing device. The method further includes combining the intermediate results from the plurality of mappers. The method also includes partitioning the combined intermediate results into intermediate results for respective reducers for the application based on respective keys of the combined intermediate results.

According to another aspect of the present invention, there is provided a system. The system can include at least one processor; a memory coupled to at least one processor; a set of computer program instructions stored in the memory. The set of computer program instructions is executable by at least one of the processors to cause the system to obtain intermediate results from a plurality of mappers for an application on a computing device; combine the intermediate results from the plurality of mappers; and partition the combined intermediate results into intermediate results for respective reducers for the application based on respective keys of the combined intermediate results.

According to still another aspect of the present invention, there is provided a computer readable non-transitory article of manufacture tangibly embodying computer readable instructions which, when executed cause a computer to carry out the steps of a method to obtain intermediate results from a plurality of mappers for an application on a computing device; combine the intermediate results from the plurality of mappers; and partition the combined intermediate results into intermediate results for respective reducers for the application based on respective keys of the combined intermediate results.

BRIEF DESCRIPTION OF THE SEVERAL VIEWS OF THE DRAWINGS

Through the more detailed description of some aspects of the present invention in the accompanying drawings, the above and other objects, features and advantages of the present invention will become more apparent, wherein the same reference generally refers to the same components in the embodiments of the present invention.

DETAILED DESCRIPTION

Some preferable aspects will be described in more detail with reference to the accompanying drawings, in which the preferable aspects of the present invention have been illustrated. However, the present invention can be implemented in various manners, and thus should not be construed to be limited to the aspects disclosed herein. On the contrary, those aspects are provided for the thorough and complete understanding of the present invention, and completely conveying the scope of the present invention to those skilled in the art.

Figure 1:
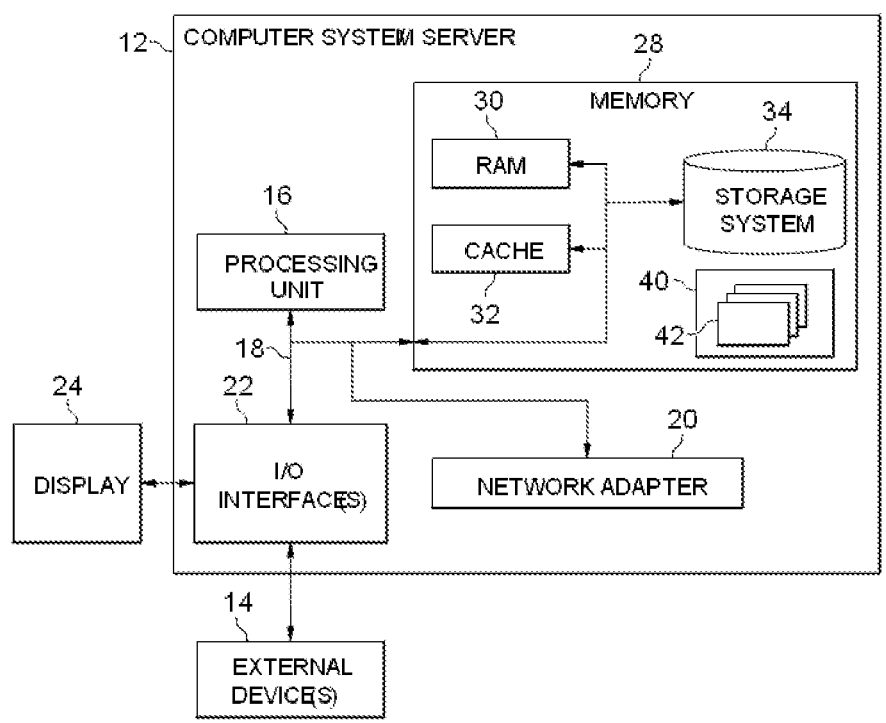
FIG. 1 schematically illustrates a block diagram of an exemplary computer system which is applicable to implement the aspects of the present invention.

Referring now to FIG. 1, in which an exemplary computer system/server 12 which is applicable to implement the aspects of the present invention is shown. Computer system/server 12 is only illustrative and is not intended to suggest any limitation as to the scope of use or functionality of aspects of the invention described herein.

As shown in FIG. 1, computer system/server 12 is shown in the form of a general-purpose computing device. The components of computer system/server 12 can include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of aspects of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of aspects of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Next, detailed description will be made to the solution as provided in the present invention with reference to aspects of the present invention. As mentioned hereinabove, in the conventional solution of Map-Reduce processing, all intermediate results are stored in a local disk after processing, which means extra processes and can result in issues such as huge I/O and etc. On the other hand, if all intermediate results are stored in memory after its generation so as to reduce processes, the huge amount of intermediate results might result in further issues such as out of memory (OOM). Thus, in aspects of the present invention, a solution of shuffle optimization in Map-Reduce processing is provided, which further processes intermediate results before transmitting to reducers in shuffling processing. Particularly, intermediate results from a plurality of mappers for an application on a computing device are collected first and then combined, and the combined intermediate results are further partitioned into intermediate results for respective reducers based on respective keys of the combined intermediate results. Thus, before transmitting to respective reducers, the intermediate results are combined together and further partitioned for the respective reducers, which means that the number of files for the intermediate results is reduced substantially. In turn, extra processes are reduced remarkably, and issues such as huge I/O, etc., can be mitigated greatly. Hereinafter, reference will be made to FIGS. 2 to 6 to describe the solution as provided herein in detail in conjunction with some example aspects.

Figure 2:
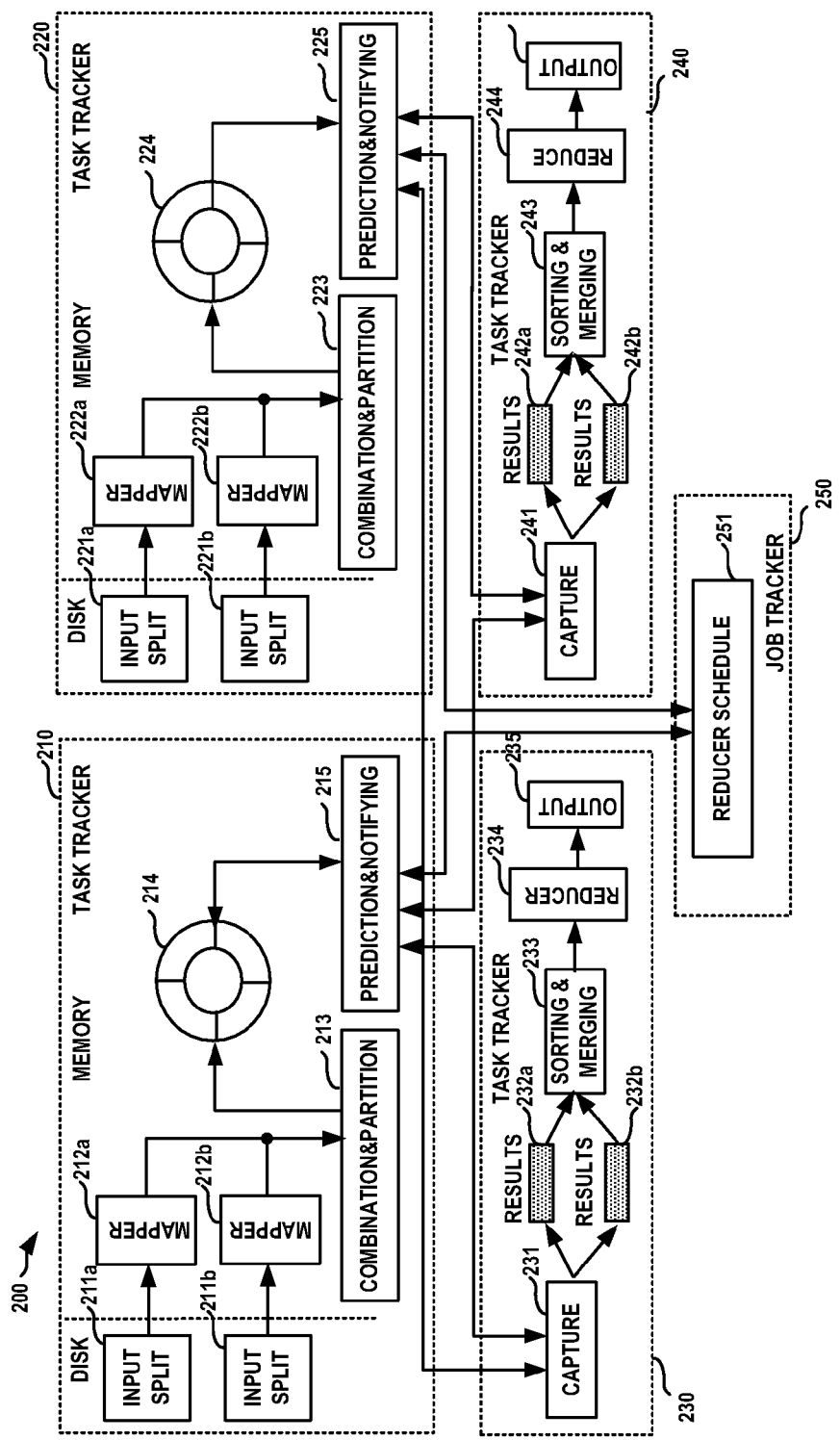
FIG. 2 schematically illustrates a block diagram of a system architecture of Map-Reduce processing in accordance with an aspect of the present invention.

FIG. 2 schematically illustrates a block diagram of system architecture of Map-Reduce processing in accordance with an aspect of the present invention. As illustrated in FIG. 2, in frame 200, there are four task trackers 210, 220, 230 and 240 for tracking tasks for the same application. In addition, there is also provided a job tracker 250 for controlling or scheduling the mapping and reducing tasks.

Task trackers 210, 220 are responsible for tracking mapping tasks for the application on different computing devices. In each of the task trackers 210, 220, input data 211$a$, 211$b$, 221$a$, 221$b$ are input, after being split, to respectively mappers 212$a$, 212$b$, 222$a$ and 222$b$. Mappers 212$a$ and 212$b$ are mappers for the application on a computing device and mappers 222$a$ and 222$b$ are mappers for the application on a different computing device. Mappers 212$a$, 212$b$, 222$a$ and 222$b$ perform mapping processings in accordance with their respective functions and intermediated results from these map modules 212$a$, 212$b$, 222$a$ and 222$b$ are collected by combination and partition modules 213, 223 respectively to further process these intermediate results. The processed intermediate results for respective reducers are stored in corresponding buffer sections in buffer storages, especially buffer rings 214, 224, instead of a disk. When a time determined based on the rate of increase in the intermediate results is reached, the combination and partition modules 213, 223 will trigger a prediction and notification modules 215, 225 so as to notify capture modules 231, 241 tracked by task trackers 230, 240 to capture intermediate results from the buffer storage and transmit intermediate results to the reducers.

Task trackers 230, 240 are respectively responsible for tracking reducing tasks for the application on different computing device, which might be similar or partly similar to, or completely different from the computing devices on which mappers 212$a$, 212$b$, 222$a$, 222$b$ are running. In each of the task trackers 230, 240, capture modules 231, 241 will respond to the notification from the prediction and notification module and capture intermediate results from a corresponding buffer storage to respective reducers when usage of the buffer storage reaches a predetermined bound. Intermediate results 232$a$, 232$b$, 242$a$, 242$b$ from buffer storages 214, 224 are further merged and sorted in a sorting and merging module 233, 243. The merged data will be processed by the respective reducers 234 and 244 based on their own reducing functions and outputs 235 and 245 are generated accordingly.

At the same time, the prediction and notification module will also monitor average rates of increases in intermediate results for the respective reducers before the buffer ring is full at the first time and provide it to the reducer schedule mode 251 in job tracker 250. Based on the average rates of increases in intermediate results for the respective reducers, the storage resource requirements can be predicted and the job reducer schedule mode 251 will schedule storage resources for the respective reducers based on the predicted storage resource requirements. Detailed description of the storage resource requirement prediction will be made with reference to FIG. 6 and thus will not be elaborated herein.

Figure 3:
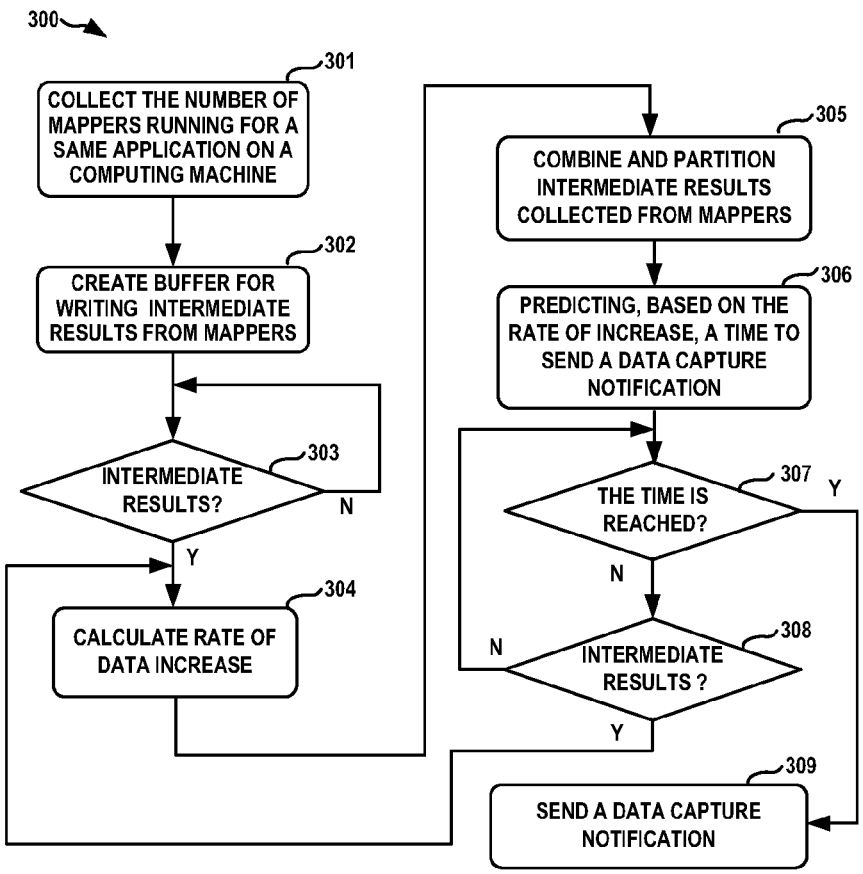
FIG. 3 schematically illustrates a flow chart of a system workflow of the Map-Reduce processing in accordance with an aspect of the present invention.

FIG. 3 further illustrates a flow chart of a system workflow of the Map-Reduce processing in accordance with an aspect of the present invention. As illustrated in FIG. 3, first in step 301 of method 300, the number of mappers running for the same application on a computing device will be obtained first. A task tracker for the computing device will track mapping tasks on that computing device and thus it will maintain information on which mappers are running for the application on the computing device. Thus, the number of mappers running for the application can be provided by the task tracker. Thus, the combination and partition module can learn information on mappers which it should be responsible for. Next, in step 302, a buffer storage (such as a buffer ring) for storing intermediate results from mappers will be created so that the mappers running for the application can share the buffer, and the buffer address will be provided to the mappers. Then in step 303, it is determined whether there are intermediate results from the mappers, i.e., whether the mappers generate the intermediate results. If there aren't any intermediate results, it means that no intermediate results are generated from the mapper yet and the method just keeps waiting for intermediate results. If there are intermediate results, the rate of increase in intermediate results from the mappers will be calculated in step 304. For example, it can calculate an increase in the amount of intermediate results per second, in a unit of bits per second (bps), kilobit per second, megabit per second, gigabit per second, etc.

Further in step 305, the intermediate results from the mappers are obtained by the combination and partition module, then are combined together and partitioned for respective reducers which are to further process these intermediate results for the application. The processed intermediate results will be stored in buffer sections in a buffer storage for the respective reducers. Detailed operations about combining and partitioning will be provided wither reference to FIG. 4 and thus will not be provided here for a purpose of simplification. Next in step 306, based on the calculated rate of data increase, a time to send a data capture notification is predicted. In other word, the time that the buffer storage requires to be collected is determined based on the rate of data increase.

Then, if in step 307, it is determined that the predicted time is reached, then a data capture notification will be sent from the prediction and notification module to the capture module in step 309. If the time is not reached yet, the method goes to step 308 to determine whether there are any further intermediate results. If there aren't any further intermediate results, the method goes back to step 307; if there are further intermediate results, the method goes back to step 304 to process the further intermediate results and, the time to send the data capture notification can be further adjusted.

So far, the system architecture and the system workflow have been described with reference to FIGS. 2 and 3 to make the skilled in the art learn the idea of the present invention as a whole, and hereinafter, reference will be made to FIG. 4 to describe a method of shuffle optimization in Map-Reduce processing in accordance with an aspect of the present invention in detail.

Figure 4:
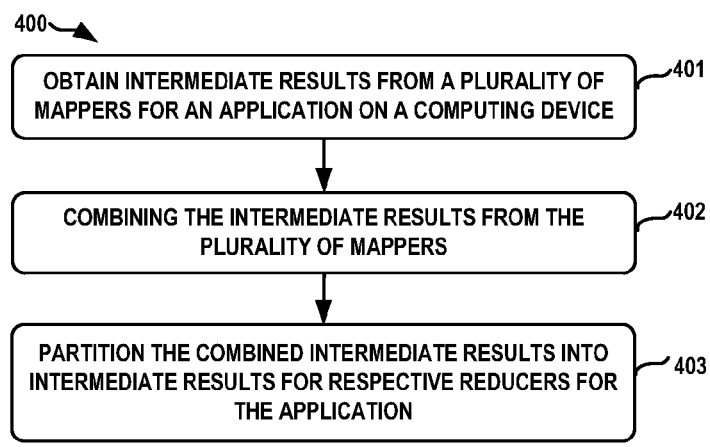
FIG. 4 schematically illustrates a flow chart of a method of shuffle optimization in Map-Reduce processing in accordance with an aspect of the present invention.

As illustrated in FIG. 4, in step 401 of method 400, intermediate results from a plurality of mappers for an application on a computing device will be first obtained or collected. As mentioned hereinabove, after the buffer storage for sharing by mappers is created by a task tracker, the buffer address will be informed to the mappers. Thus, when intermediate results are generated, the mappers can flush the intermediate results to the buffer storage by using the buffer address. However, before flushing the intermediate results from the mappers into the buffer storage, these intermediate results will be obtained or intercepted by the combination and partition module first so as to process them before storing in the buffer storage. The intermediate results can be obtained or intercepted through various mechanisms. For example, the combination and partition module can function as a proxy for storing the intermediate results into the buffer storage. Thus, any intermediate results from the mappers to the buffer storage will be transmitted to the combination and partition module first and thus the intermediate results can be obtained or intercepted. Besides, the intermediate results can be also obtained or intercepted based on a channel mechanism, which is a scheme for storing data to a destination. In the channel mechanism, the data will be stored into the destination through a channel in which, additional operations such as combination and partition can be performed. In this way, the intermediate results from all of the mappers can be obtained as well.

Next, in step 402, the intermediate results for the plurality of mappers are combined. In this step, the intermediate results from the plurality of mappers will be merged together, which means intermediate results will not be stored in term of mappers but combined together for further processing. Particularly, intermediate results with the same key can be combined together to further reduce redundancy of the intermediate results. An intermediate result produced from a mapper is a key-value pair including a key and a value. Since the input data are randomly distributed into the plurality of mapper, there is a great possibility that there are intermediate results with the same key among the intermediate results from the plurality of mappers. Those intermediate results with the same key can be combined together to form a new intermediate result. For example, the new intermediate result can include the key which is common to those intermediate results and their values can be merged together in a suitable way. Thus, the redundant information in the intermediate results will be reduced substantially and thus the size of the intermediate results will be reduced before storing into any storage. However, it shall be appreciated that it is also possible to implement the present invention without combining the intermediate results with the same key, which, however, means the existence of redundancy of the intermediate results.

Then in step 403, the combined intermediate results will be partitioned for respective reducers for the application based on their respective keys of the combined intermediate results. Generally, different reducers will be responsible for processing intermediate results with different key ranges. Before storing into storage, the combined intermediate results can be further partitioned based on their keys of the combined intermediate results so that the intermediate results for the same reducer are grouped together. Thus, the intermediate results for the same reducer can be stored in the same storage section or the same file for transmitting.

In one aspect of the present invention, the intermediate results for the respective reducers can be stored on a disk and intermediate results for the same reducer can be stored in the same one file. Thus, the number of files will be equal to the number of reducers, which is reduced substantially compared to that in the conventional solution as mentioned in background. Thus the number of I/O can be decreased remarkably.

In another aspect of the present invention, the intermediate results are stored in buffer storage instead of on the disk. Particularly, the buffer storage will be partitioned into buffer sections for the respective reducers to store their respective intermediate results. That is to say, in the buffer storage, there is provided a specific storage section for each of the reducers so that the intermediate results for each of the reducers can be stored in its own specific storage section. Thus, when the buffer storage is about to be full, the intermediate results can be transmitted directly from respective storage sections in the buffer storage to the respective reducers directly without storing them onto the disk and copying them back to a memory. However, in the conventional solution, all intermediate results will be stored in memory after their generation, then stored on a local disk after computation and copied back into memory for network transmission. Thus, it will result in extra processes, huge I/O and OOM. Unlike the conventional solution, in the solution as proposed in the present invention, the intermediate results are stored in the buffer storage from the beginning to the end, and thus no extra processes are required to store them onto the disk or copy them back into memory; and at the same time, the intermediate results will be transmitted to the reducers during the processing by the mappers instead of after all intermediate results are generated, which means only a small amount of intermediate results will be stormed in the memory and thus OOM will be mitigated substantially.

The sizes of buffer sections for the respective reducers can be further determined based on predicted ratio of amounts of the intermediate results for respective reducers. For example, buffer sections for the respective reducers can have even sizes when the buffer storage is created and sizes of the buffer sections for the respective reducers can be adjusted based on the predicted ratio of amounts of the intermediate results for respective reducers after the intermediate results are partitioned. Specifically, when the combined intermediate results are partitioned for the respective reducers, it can learn amounts of intermediate results for respective reducers and thus the ratio or proportion of amounts of intermediate results for respective reducers can also be determined. Based on the ratio, the sizes of the buffer sections for the respective reducers can be adjusted. Moreover, the sizes of the buffer sections for the respective reducers can be further adjusted based on new ratio after a subsequent partition of combined intermediate results. In such a way, the buffer storage can be used in an efficient way.

The buffer storage can be any kind of buffer and in one aspect of the present invention, the buffer storage is designed as a buffer ring. The buffer ring, also called as a cyclic buffer or a circular buffer, is a single fixe-sized buffer as if it is connected end to end, which functions based on first-in-first-out (FIFO). Due to the FIFO and the ring structure, new intermediate results can be stored just behind the latest intermediate results in the buffer ring even when the intermediate results are being transmitted to the respective reducers. This means that the transmission of old intermediate results and the buffering of new intermediate results can be performed at the same time without any other mechanisms such as latching, locking, moving data or the like.

In one aspect of the present invention, data capture notification can be sent to indicate the intermediate results for respective reducers stored in the buffer storage can be transmitted to the respective reducers. The data capture notification can be sent for example when the buffer storage is about to be full, for example, when the usage of the buffer reaches a usage limit. In another aspect of the present invention, a rate of increase in the intermediate results stored in the buffer storage will be monitored and the time at which the data capture notification shall be sent can be predicted based on the rate of increase in addition to the size of the buffer storage. The data capture notification will be sent when the predicted time is reached. Besides, before the predict time is reached, the time can be further adjusted based on the updated rate of increase in the intermediate results when new intermediate results are partitioned.

When the time is reached, the prediction and notification module will be trigger to send such a data capture notification to the capture modules. Particularly the capture modules will transmit the intermediate results for respective reducers stored in the buffer storage to the respective reducers if usage of the buffer storage reaches a predetermined bound. Hereinafter, reference will be made to FIG. 5 to describe the data capture process in accordance with one aspect of the present invention.

Figure 5:
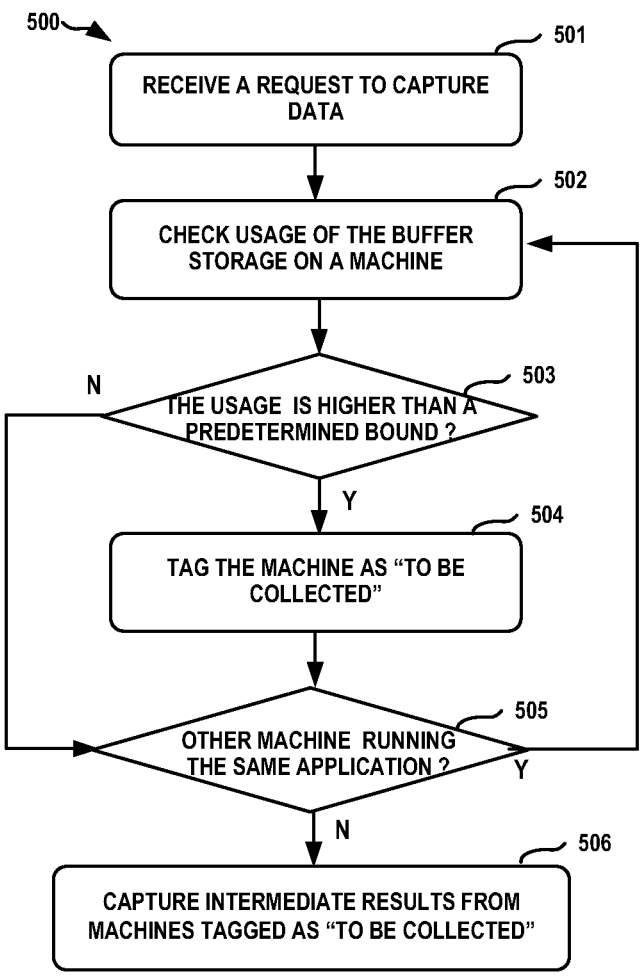
FIG. 5 schematically illustrates a flow chart of a method of intermediate results transmission in accordance with an aspect of the present invention.

As illustrated in FIG. 5, the method 500 starts from step 501, in which a data capture notification or request is received. After receiving the notification or request, the data capture process does not start immediately; instead, the usage of the buffer storage on the computing machine is checked in step 502. Further in step 503, it is determined whether the usage is higher than a predetermined bound. If the usage does not reach the predetermined bound, the method goes to step 505; if the usage is higher than the predetermined bound, then the method proceeds with step 504 to tag the computing machine as "to be collected" and the method goes to step 505. In step 505, it will be determined whether there is another machine running the same application. If there is another machine, the method goes back to step 502 and check the other machine. Otherwise, if there is not any other machine, then the method proceeds with step 506 in which intermediate results on all machines tagged as "to be collected" will be captured and transmitted to the respective reducers. Particularly, a capture module will build connections between the reducers which it is responsible for and the mappers on the machines tagged as "to be collected" and transmit intermediate results to these reducers on those built connections.

Besides, before the buffer storage is first full, average rates of increase in the intermediate results for respective reducers stored in the buffer storage will be also monitored and the average rates of increase in the intermediate results for respective reducers can be used to predict storage resource requirements for the respective reducers. In the conventional solution, both mappers/reducers occupy the same size of storage resource and the underlying reason lies in that the size of inputs for respectively mapper is the same; however, it is not true for the reducers. Thus, it is proposed to determine storage resources for the respective reducers based on the storage resource requirements for the respective reducers predicted from average rates of increase in the intermediate results for respective reducers. Next, operations about the storage resource requirements prediction will described with reference to FIG. 6.

Figure 6:
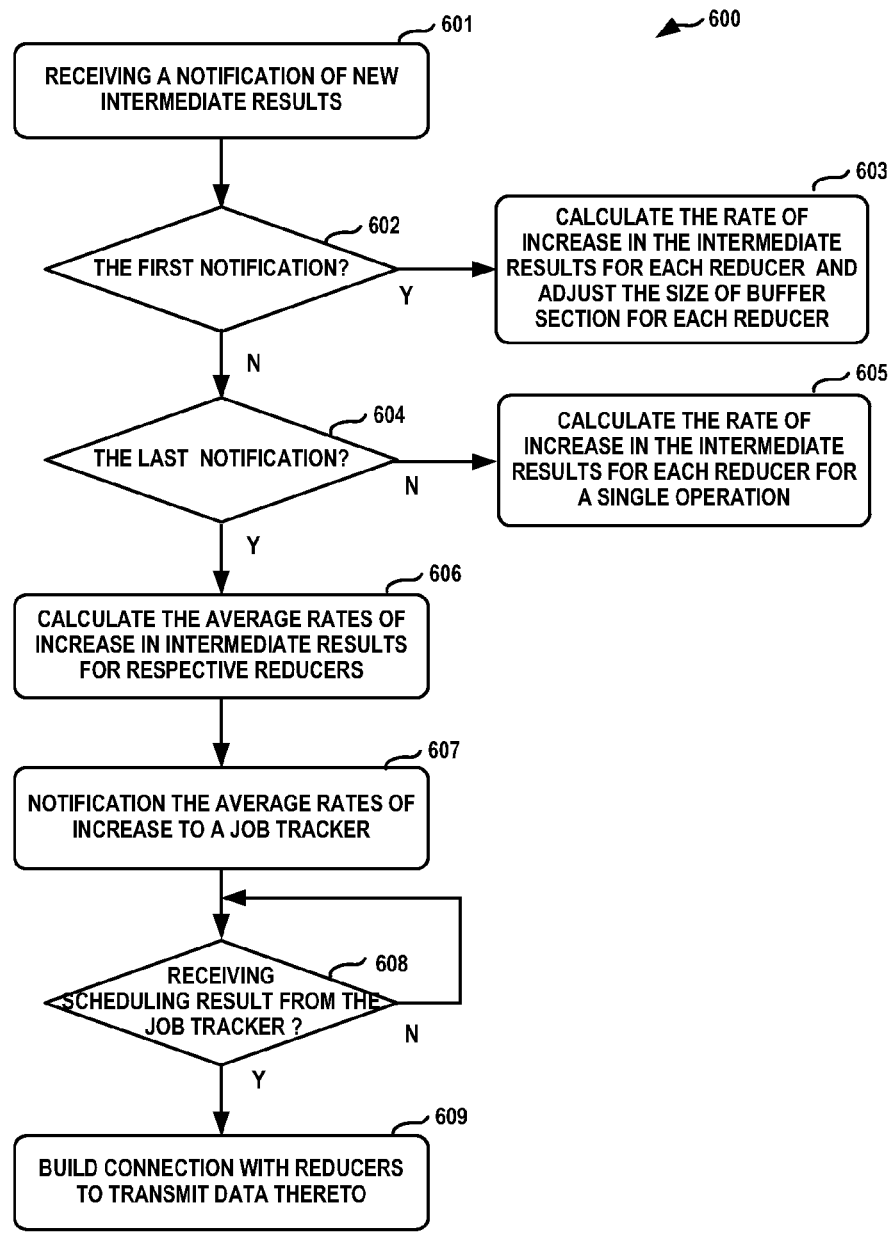
FIG. 6 schematically illustrates a flow chart of a method of predicting reducer resource requirements in accordance with an aspect of the present invention.

FIG. 6 illustrates a flow chart of a method of predicting reducer resource requirements in accordance with one aspect of the present invention. This method can be performed before the buffer storage is full at the first time since the storage resources for the respective reducers shall be determined before instantiations of the reducers and cannot be changed or adjusted after that.

As illustrated in FIG. 6, the method 600 starts from step 601 in which a notification of intermediate results is received. When the combination and partition of intermediate results are finished, a notification of new intermediate results can be issued so as to inform that there are new intermediate results. Then, it can be determined in step 602 whether it is the first notification before the buffer storage is about to be full. If there is no any other notification yet, then it means that it is the first notification and the method goes to step 603 in which the rate of increase in the intermediate results for each reducer is determined. Thus, the size of buffer section for each reducer can be adjusted based on the rate of increase in the intermediate results. If it is not the first notification, then in step 604 it is determined that whether it is the last notification before the buffer storage is about to be full. If this is not the last notification, then the rate of increase in the intermediate results for each reducer is determined for this single operation. Additionally, the size of buffer section for each reducer can be also be further adjusted based on the new rate of increase in the intermediate results. If it is the last notification, then in step 606, the average rate of increase in intermediate results for the respective results will be determined based on the calculated rates of increase in the intermediate resulted for each reducer for various notifications including the last notification. Then in step 607, the calculated average rates of the increase for respective reducers will be informed to a job tracker. In step 608, the method just waits the scheduling result from the job tracker. The job tracker, especially the reducer schedule module, will instantiate respective reducers for the application and determine the storage resources for the respective reducers based on the calculated average rates of the increase for respective reducers. Particularly, from the average rates of increases in intermediate results for the respective reducers, the job tracker will learn the ratio of data amounts for the respective reducers. Besides, the job tracker, as a functionality entity for tracking the whole Map-Reduce processing, also learns the total amount of data input to the mappers. Thus, based on the ratio of data amounts for the respective reducers and the total amount of data input to the mappers, the job tracker can further predict the storage resource requirements for the respective reducers. Therefore, the reducer schedule module can schedule storage resources for the respective reducers based on the predicted storage resource requirements for the respective reducers. Once the capture module receives the scheduling results, it will build connections with the reducers so as to transmit the intermediate results stored in the buffer storage to the reducers. Hence, different from the conventional solution, in one aspect of the present invention, the storage resources for the respective reducers are not even but are determined based on the storage resource requirements predicted from the calculated average rates of the increase for respective reducers and therefore the storage resources can be used efficiently.

In another aspect of the present invention, there is further provided a system for shuffle optimization in Map-Reduce processing. The system can include at least one processor; a memory coupled to at least one of the processors; and a set of computer program instructions stored in the memory. These computer program instructions and executable by at least one of the processors to cause the system to: obtain intermediate results from a plurality of mappers for an application on a computing device; combine the intermediate results from the plurality of mappers; and partition the combined intermediate results into intermediate results for respective reducers for the application based on respective keys of the combined intermediate results.

In one aspect of the present invention, intermediate results with a same key are combined together during combining the intermediate results.

In another aspect of the present invention, the system can be further caused to store the intermediate results for respective reducers into a buffer storage which is partitioned into buffer sections for the respective reducers to store their respective intermediate results.

In a further aspect of the present invention, sizes of the buffer sections for the respective reducers can be determined based on a predicted ratio of amounts of the intermediate results for respective reducers and the buffer storage can be a buffer ring.

In a still further aspect of the present invention, the system can be further caused to send a data capture notification to indicate that the intermediate results for respective reducers stored in the buffer storage can be transmitted to the respective reducers.

In a yet further aspect of the present invention, the system can be further caused to: monitor a rate of increase in the intermediate results stored in the buffer storage; and predict, based on the rate of increase, a time at which the data capture notification shall be sent, wherein the data capture notification is sent when the predicted time is reached.

In a still yet further aspect of the present invention, the intermediate results for respective reducers stored in the buffer storage can be transmitted to the respective reducers if it is further monitored that usage of the buffer storage reaches a predetermined bound.

In a yet still further aspect of the present invention, the system can be further caused to monitor average rates of increase in the intermediate results for respective reducers stored in the buffer storage before the buffer storage is full at the first time, wherein storage resources for the respective reducers can be determined based on storage resource requirements for the respective reducer predicted from the monitored average rates of increase for the respective reducers.

For a purpose of simplification, detailed description of operations of the system will not be elaborated herein, and for details of these operations, one can refer to description with reference to FIGS. 2 to 6.

Furthermore, there is also provided a computer program product including a machine-readable medium having program instructions embodied therewith, the program instructions executable by a device to cause a device perform the method as described herein after. Similarly, for a purpose of simplification, detailed description of steps of the method will not be elaborated herein, and for details, one can also make reference to description with reference to FIGS. 2 to 6.

It is to be understood that the modules shown in FIG. 2 can be implemented by various manners, including software, hardware, firmware or a random combination thereof. For example, in some aspects, at least one module can be implemented by software and/or firmware. Alternatively or additionally, the system described above can also be implemented partially or completely based on hardware. For example, at least one module in frame 200 can be implemented as an integrated circuit (IC) chip, an application-specific integrated circuit (ASIC), a system on chip (SOC), a field programmable gate array (FPGA), and the like.

The present invention can be a system, an apparatus, a device, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some aspects, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products in accordance with aspects of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products in accordance with various aspects of the present invention. In this regard, each block in the flowchart or block diagrams can represent a module, segment, or portion of code, which includes at least one executable instructions for implementing the specified logical function (s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

We claim:

1. A computer implemented method for shuffle optimization in map-reduce processing, comprising:
   obtaining intermediate results from a plurality of mappers for an application on a computing device;
   combining the intermediate results from the plurality of mappers;
   partitioning the combined intermediate results into intermediate results for respective reducers for the application based on respective keys of the combined intermediate results;
   storing the intermediate results for the respective reducers into a buffer storage;
   partitioning the buffer storage into buffer sections for the respective reducers to store their respective intermediate results, wherein sizes of the buffer sections for the respective reducers are determined based on a predicted ratio of amounts of the intermediate results for respective reducers;
   monitoring a buffer storage usage and a rate of increase in the intermediate results stored in the buffer storage;
   predicting, based on the rate of increase in the intermediate results, a time at which a data capture notification shall be sent;
   sending the data capture notification, to indicate that the intermediate results for respective reducers stored in the buffer storage can be transmitted to the respective reducers, based on a predicted time being reached; and
   transmitting the intermediate results for the respective reducers to the respective reducers, based on the monitored buffer storage usage.

2. The method of claim 1, wherein the combining the intermediate results comprises combining intermediate results with a same key together.

3. The method of claim 1, further comprising:
   monitoring average rates of increase in the intermediate results for respective reducers stored in the buffer storage before the buffer storage is full at a first time;
   wherein storage resources for the respective reducers are determined based on storage resource requirements for the respective reducer predicted from the monitored average rates of increase for the respective reducers.

4. A system for shuffle optimization in map-reduce processing, comprising:
   one or more processors;
   a memory coupled to at least one of the processors; and
   a set of computer program instructions stored in the memory and executable by at least one of the processors to perform the steps of:
      obtaining intermediate results from a plurality of mappers for an application on a computing device;
      combining the intermediate results from the plurality of mappers;
      partitioning the combined intermediate results into intermediate results for respective reducers for the application based on respective keys of the combined intermediate results;
      storing the intermediate results for the respective reducers into a buffer storage;
      partitioning the buffer storage into buffer sections for the respective reducers to store their respective intermediate results, wherein sizes of the buffer sections for the respective reducers are determined based on a predicted ratio of amounts of the intermediate results for respective reducers;
      monitoring a buffer storage usage and a rate of increase in the intermediate results stored in the buffer storage;
      predicting, based on the rate of increase in the intermediate results, a time at which a data capture notification shall be sent;
      sending the data capture notification, to indicate that the intermediate results for respective reducers stored in the buffer storage can be transmitted to the respective reducers, based on a predicted time being reached; and
      transmitting the intermediate results for the respective reducers to the respective reducers, based on the monitored buffer storage usage.

5. The system of claim 4, wherein the combining the intermediate results further comprises combining intermediate results with a same key together.

6. The system of claim 4, further comprising:
   monitoring average rates of increase in the intermediate results for respective reducers stored in the buffer storage before the buffer storage is full at a first time;
   wherein storage resources for the respective reducers are determined based on storage resource requirements for the respective reducer predicted from the monitored average rates of increase for the respective reducers.

7. A computer readable non-transitory article of manufacture tangibly embodying computer readable instructions which, when executed, cause a computer to carry out the steps of a method comprising:
   obtaining intermediate results from a plurality of mappers for an application on a computing device;
   combining the intermediate results from the plurality of mappers;
   partitioning the combined intermediate results into intermediate results for respective reducers for the application based on respective keys of the combined intermediate results;
   storing the intermediate results for the respective reducers into a buffer storage;
   partitioning the buffer storage into buffer sections for the respective reducers to store their respective intermediate results, wherein sizes of the buffer sections for the respective reducers are determined based on a predicted ratio of amounts of the intermediate results for respective reducers;
   monitoring a buffer storage usage and a rate of increase in the intermediate results stored in the buffer storage;
   predicting, based on the rate of increase in the intermediate results, a time at which a data capture notification shall be sent;
   sending the data capture notification, to indicate that the intermediate results for respective reducers stored in the buffer storage can be transmitted to the respective reducers, based on a predicted time being reached; and
   transmitting the intermediate results for the respective reducers to the respective reducers, based on the monitored buffer storage usage.

8. The computer readable non-transitory article of manufacture tangibly embodying computer readable instructions of claim 7, wherein the combining the intermediate results further comprises combining intermediate results with a same key together.

* * * * *